United States Patent [19]
Hickey

[11] 3,876,298
[45] Apr. 8, 1975

[54] SHUTTER AND SLIDE CLAMP CONTROL MECHANISM FOR A REAR-SCREEN PROJECTOR

[75] Inventor: Roy E. Hickey, Honeoye Falls, N.Y.

[73] Assignee: The Singer Company, New York, N.Y.

[22] Filed: May 29, 1973

[21] Appl. No.: 364,398

[52] U.S. Cl. .................. 353/88; 353/95; 353/111
[51] Int. Cl. ................... G03b 21/14; G03b 23/04
[58] Field of Search .......... 353/88, 92, 95, 111, 117

[56] References Cited
UNITED STATES PATENTS

| | | | |
|---|---|---|---|
| 3,138,962 | 6/1964 | Maiershofer | 353/88 |
| 3,411,845 | 11/1968 | Pester et al. | 353/88 |
| 3,507,571 | 4/1970 | White | 353/78 |

*Primary Examiner*—Richard E. Aegerter
*Assistant Examiner*—Steven L. Stephan

[57] ABSTRACT

A slide projector located within a rear-screen projector housing has a slide tray and slide positioning mechanism, which includes a shutter and slide clamp control portion, in cooperative relation with a gravity feed slide tray which is removably mounted on the rear-screen projector housing. The projector includes a slide gate having a shutter mounted for rotation. Control means cause the shutter to be in a first position blocking the optical path of the projector in response to the absence of a slide in the projector gate and also cause the shutter to be in a second position enabling the optical path of the projector whenever a slide is present in the projector gate.

15 Claims, 8 Drawing Figures

3,876,298

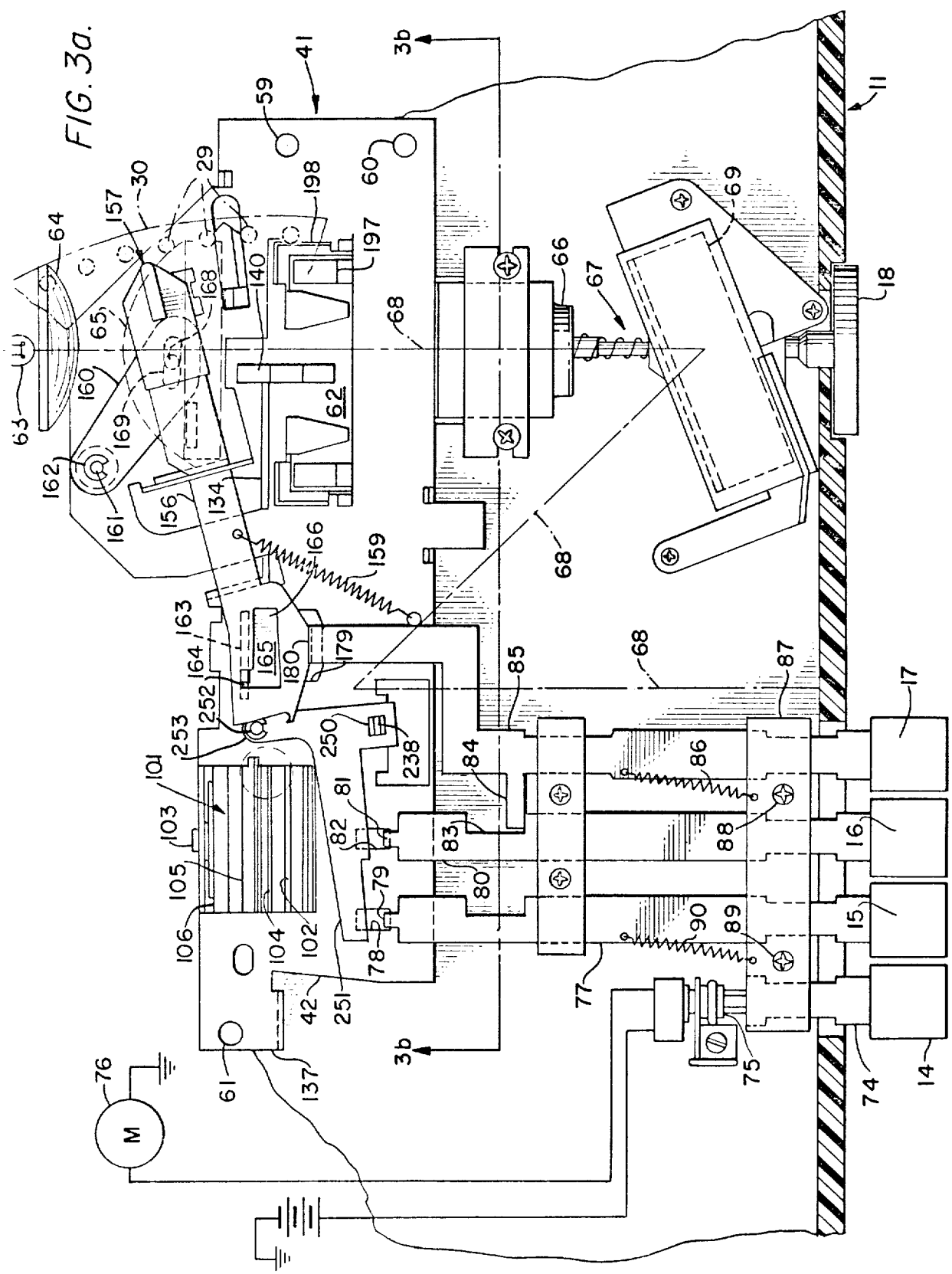

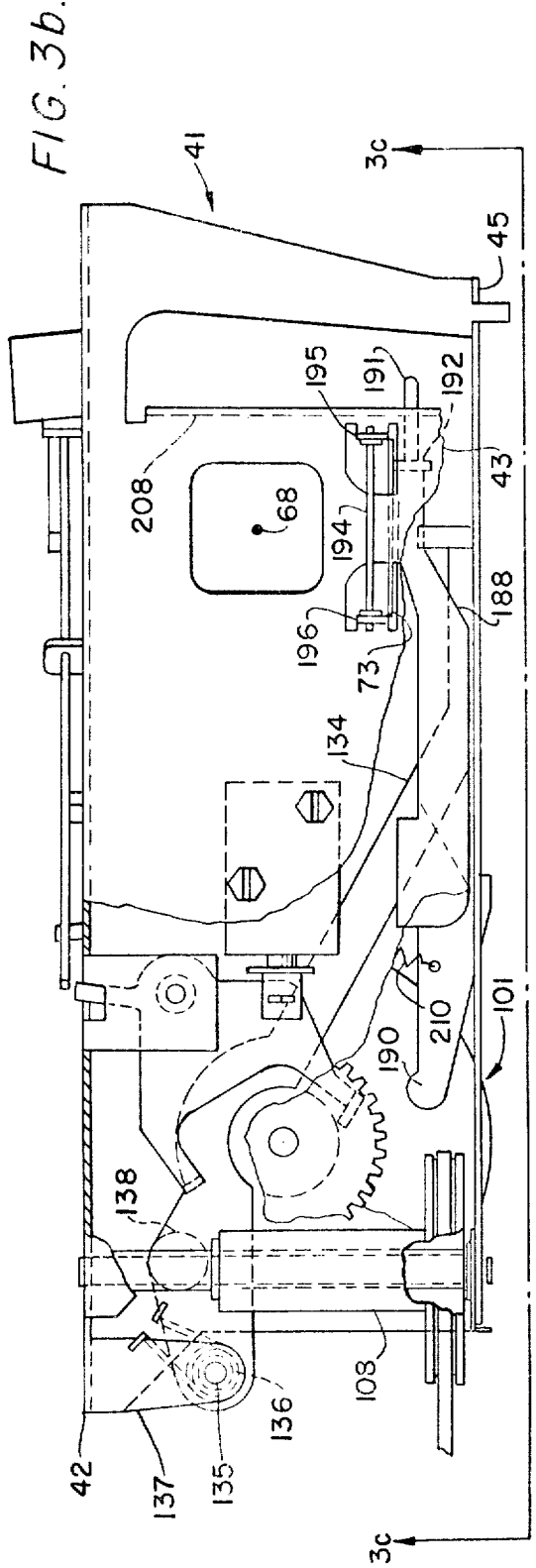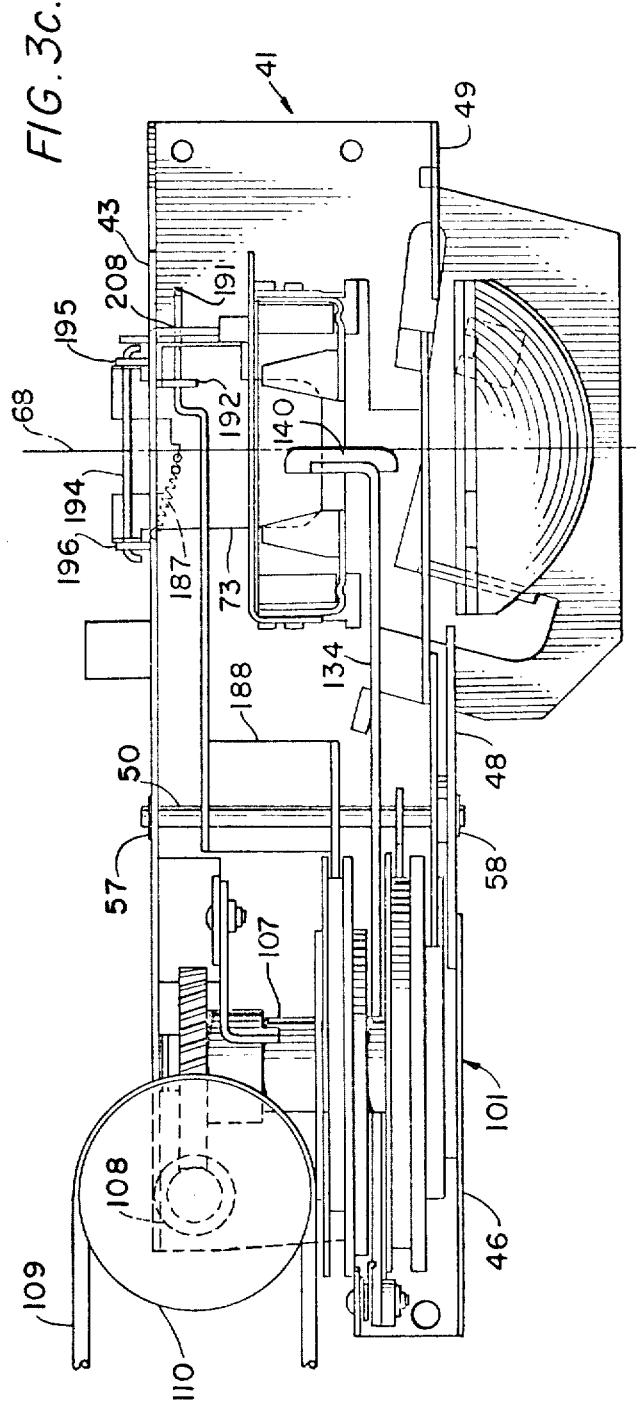

SHUTTER AND SLIDE CLAMP CONTROL MECHANISM FOR A REAR-SCREEN PROJECTOR

BACKGROUND OF THE INVENTION

Field Of The Invention

This invention relates to shutter and slide clamp control mechanisms and more particularly to shutter and slide clamp control mechanisms that are contained within a rear-screen projector housing but in cooperative relation with a slide tray removably mounted on the exterior of the rear-screen projector housing.

One object of this invention is to provide an improved shutter and slide clamp control mechanism.

Another object of this invention is to provide a shutter and slide clamp control mechanism for a rear-screen projector.

Still another object of this invention is to provide an improved shutter and slide clamp control mechanism that is contained within a rear-screen projector and in cooperative relation with a slide tray removably mounted on the exterior of the rear-screen projector housing.

SUMMARY OF THE INVENTION

Briefly described, the present invention is used in conjunction with a slide tray, containing a plurality of image bearing slides, which is moved relative to a projector gate for successively bringing slides in the slide tray into vertical registration with the projector gate. Means for controlling a shutter associated with the projector gate includes means biasing the shutter in a position wherein the optical path of the projector is not blocked by the shutter; means for rotating the shutter around its rotational axis to a position, in opposition to the biasing means, in which the optical path of the projector is blocked, means enabling counter-rotation of the shutter around its rotational axis to its orginal position which does not block the optical path, under the urging of the biasing means; and means for sensing the absence of a slide in the projector gate for latching the means for rotating the shutter in the position wherein the shutter blocks the optical path, and for enabling the return of the shutter to its initial position for which the optical path is not blocked when a slide is in the projector gate. A slide clamp is operated in time relation with the shutter control mechanism.

More specifically, the shutter and slide clamp control mechanism is contained within a rear-screen projector housing with a slide tray removably mounted on the exterior of the rear-screen projector housing. The image projected by the projector is folded one or more times within the housing by mirror(s) before being projected onto the rear of a viewing screen contained in a wall of the rear-screen projector housing.

BRIEF DESCRIPTION OF THE DRAWINGS

The various features, objects and advantages of the present invention will be readily apparent from the following detailed description taken in conjunction with the following drawings, wherein like reference characters designated like or correspondingly parts throughout the several views, and wherein:

FIG. 3a illustrates a slide tray and slide positioning mechanism which includes the shutter and slide clamp control mechanism of this invention;

FIG. 3b illustrates the slide tray and slide positioning mechanism portion of FIG. 3a looking in the direction of the arrows b—b;

FIG. 3c illustrates the slide tray and slide positioning mechanism of FIG. 3b looking in the direction of the arrows c—c;

DESCRIPTION OF THE INVENTION

Figure 1:
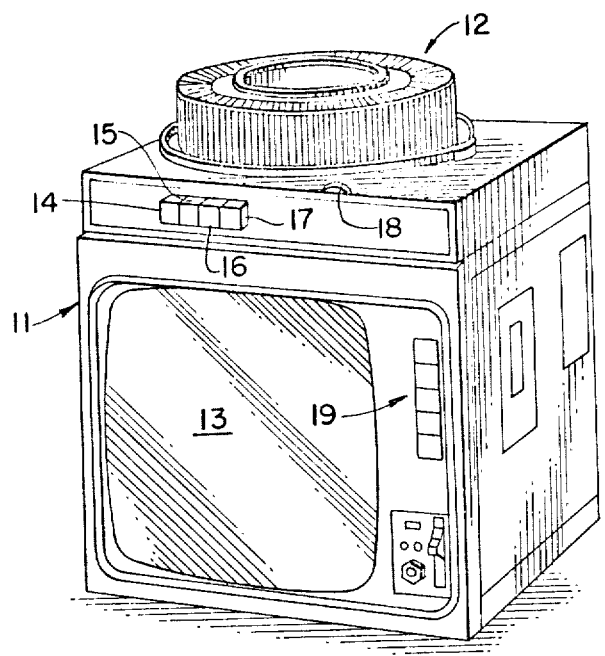
FIG. 1 is a perspective view of a rear-screen projector which may utilize the present invention.

Apparatus which may utilize the present invention is shown in FIG. 1 as comprising a rear-screen projector having a housing 11 in the general shape of a cube. A gravity feed slide tray 12, such as that used with a Kodak Carousel projector, is removably mounted on the top of the rear-screen projector. Located within the housing 11 beneath the slide tray 12 is a slide tray and slide positioning mechanism (not shown FIG. 1) which includes the shutter and slide clamp control mechanism of this invention. The slide projector projects the image of successive slides in the slide tray onto the rear of a viewing screen 13 contained in the front of the rear-screen projector housing 11. Since the screen 13 is located near the image being projected, it is necessary that the path of the projected image be folded one or more times before being displayed on the screen 13. This is accomplished by the use of one or more mirrors (not shown FIG. 1) within the housing 11 in a well known manner. This enables a much larger image to be obtained on the viewing screen 13 than could be obtained within the confines of the projector housing 11 without folding the optical path of the projected image.

The rear-screen projector can be operated by a plurality of manually actuated, push buttons 14, 15, 16 and 17 located above the viewing screen 13. Push button 14 actuates an ON-OFF switch which controls electrical power to the rear-screen projector. Manually actuated push button 15 is an ADVANCE device which causes the next slide in the slide tray to be projected onto the viewing screen 13. If the ADVANCE push button 15 is held in the depressed state, the slide tray will continue to advance resulting in successive slides being projected, in sequence, onto the viewing screen 13. Manually actuated push button 16 provides a SELECT control. When actuated, the SELECT push button 16 disables an automatic slide tray indexing means and allows the slide tray 12 to be manually located to any desired position. Manually actuatable push button 17 provides a HOLD function which, when actuated, disables the automatic slide tray indexing means to prevent projection of successive slides in the slide tray 12 until release of the HOLD push button 17.

The rear-screen projector housing 11 may also enclose a cassette tape deck, (not shown) the standard control buttons 19 for which are shown as being located to the right of the viewing screen 13. In addition to providing audio accompanyment to the images projected on the viewing screen 13, the cassette tape may also include a cue tract that provides electrical pulses for actuating the slide tray and slide positioning mechanism to control the sequence of slide images projected onto the viewing screen 13 in synchronism with the audio.

Additionally, a hand held switch (not shown) connected to the rear-screen projector by an electrical cable (not shown) may be utilized to operate the rear-screen projector.

A control knob 18 extending from the top of the rear-screen housing provides a focus adjustment for the image projected onto the viewing screen 13.

Figure 2A:
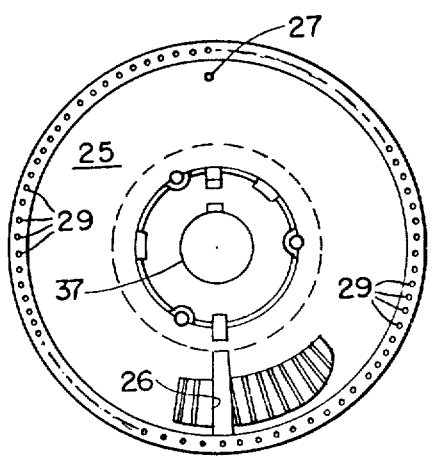
FIG. 2a illustrates the bottom of the slide tray used with the rear-screen projector of FIG. 1.
Figure 2B:
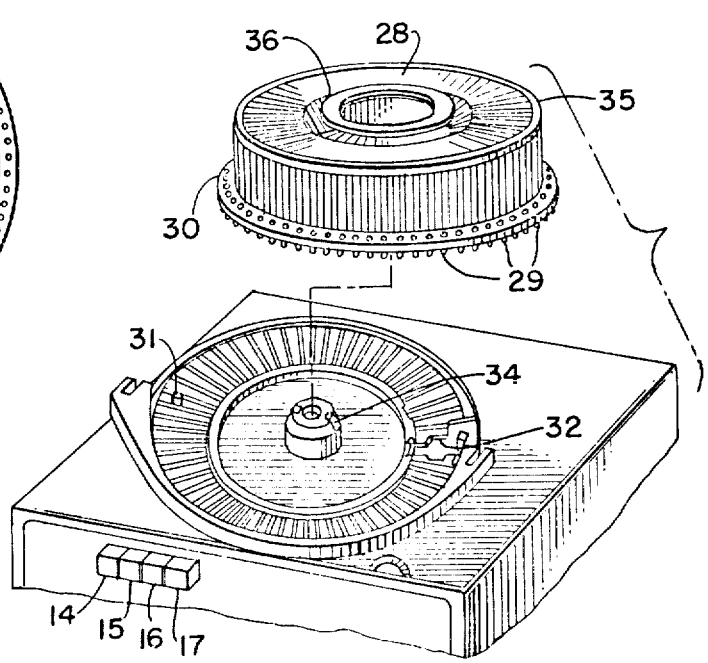
FIG. 2b illustrates the top surface of the rear-screen projector and the slide tray with which it cooperates.

The gravity feed slide tray 12 and the cooperative relationship between the slide tray 12 and the top of the rear-screen projector is substantially identical to that described in U.S. Pat. No. 3,276,156 filed Feb. 23, 1962 in the name of Herbert T. Robinson, the disclosure of which is incorporated herein by reference. Briefly described, however, and as shown in FIGS. 2a and 2b, the slide tray contains a first portion 25, such as an annular disk, having an opening therein 26 through which successive slides contained in the slide tray may pass and another opening 27 for properly locating the slide tray 12 on the top of the rear-screen projector. A second portion 28 of the slide tray includes inner 36 and outer 35 concentric walls with a plurality of separators connected therebetween to form slide compartments and is rotatably coupled to the first portion 25. Additionally, the second portion contains a plurality of indexing pins 29 depending from a rim 30 thereon which enable the second portion 28 to be rotated relative to the first portion 25.

An opening 37 in the center of the slide tray 12 is designed to fit over a spindle 34 protruding from the top of the rear-screen projector. A positioning pin 31 projecting from the top of the rear-screen projector engages the opening 27 in the first portion 25 of the slide tray 12 to accurately locate the slide tray on the top of the rear-screen projector and retain the first portion 25 of the slide tray 12 in a fixed position. An opening 32 in the top of the rear-screen projector is located above the projector gate (not shown FIGS. 2a and 2b) within the rear-screen housing 11 and below the opening 26 in the slide tray 12. When indexed, successive slides in the slide tray 12 are positioned over the opening 26 in the slide tray 12 which is located over the opening 32 in the rear-screen projector 11 such that successive slides are lowered into the projector gate 62 (FIG. 3a) and projected onto the screen 13 of the rear-screen projector and then placed back in the slide tray 12.

Referring now to FIGS. 3a, 3b and 3c, the slide tray and slide positioning mechanism, which includes the shutter and slide clamp control mechanism of this invention, is illustrated as including an elongated rectangular housing 41 including a plurality of flat side members 42, 43, 45, 46, 48 and 49 which can be secured together by any number of well known means (not shown). A spindle or shaft 50 extends through side numbers 48 and 43 and is retained in position by retaining rings 57 and 58 secured to opposite ends thereof. The rectangular housing 41 is mounted to the underside of the top of the rear-screen projector housing by means of the openings 59, 60 and 61 on the side member 42 by any number of well known means (not shown).

A projector gate 62 is located in the right hand portion of the housing 41 and is positioned under the opening 32 in the top of the rear-screen projector housing (FIG. 2a). An electric lamp 63 is located behind the projector gate 62 with condenser lens 64 and 65 being located between the projector lamp 63 and the projector gate 62. Mounted in front of the projector gate 62, in line with the optical path 68 of the projector is an objective lens barrel 66 having an adjustable focusing mechanism 67 attached thereto which is coupled to the focusing control knob 18. Since the image on a slide is projected onto the rear of the viewing screen 13, the light from the projector lamp 63 is projected through a slide (not shown) in the projector gate 62, through the mirror system and onto the viewing screen 13. The projector gate 62 includes a shutter 73 (FIGS. 3b and 3c) having a position as shown wherein the projector optical path 68 is not blocked and another position (not shown FIGS. 3a, 3b and 3c) for which the optical path 68 is blocked, thereby preventing projection of an image onto the screen 13 (FIG. 1). Located at an angle to the optical path 68 of the projector is a mirror 69 which is secured to the rear-screen projector housing 11 by any number of well known means (not shown). This mirror may be adjustably mounted in a manner as described in co-pending application entitled ADJUSTABLE MIRROR MOUNT filed May 29, 1973 and having Ser. No. 364,470. The mirror 69 folds the optical path 68 of the projector by projecting the optical path 68 beneath the rectangular housing 41 toward the rear of the rear-screen projector housing 11 to a second mirror (not shown) the surface of which is parallel to the mirror 69. The second mirror directs the optical path 68 onto the rear of the viewing screen 13.

Located at the left hand portion of the housing 41 are the manually actuated push buttons 14, 15, 16 and 17 discussed hereinabove in conjunction with FIG. 1. ON-OFF push button 14 (FIG. 3a) contains a flat elongated member 74 extending into the rear-screen projector housing 11. Actuation of the ON-OFF push button 14 causes actuation of an electrical switch 75 which is in contact with member 74 and which controls application of electrical power to the rear-screen projector components such as the projector lamp 63 and an electric motor 76, etc. The ADVANCE push button 15 includes an elongated member 77 having a depending portion 79 at the end thereof which extends into an opening 78 in the side 42 of the housing 11. The ADVANCE push button 15 is biased to its normal position by a spring 90 connected between the elongated member 77 and a retaining and positioning member 87 secured to the rear-screen projector housing 11 by any number of suitable means such as the screws 88 and 89. The extent of movement of the ADVANCE push button 15 is controlled by the opening 78. In like manner, the SELECT push button 16 contains an elongated member 80 having a depending portion 81 at one end thereof that extends into an opening 82 in the side member 42. The elongated member 80 contains an indented portion 83 into which extends a dog 84 that laterally extends from an elongated portion 85 associated with the HOLD push button 17. As will be obvious from a perusal of FIG. 3a, actuation of the SELECT push button 16 also causes actuation of the HOLD push button 17 while actuation of the HOLD push button 17 does not cause actuation of the SELECT push button 16. Accordingly, only a single biasing spring 86 connected between the elongated member 85 of the HOLD push button 17 and the retaining member 87 is needed to bias both the SELECT 16 and HOLD 17 push buttons to their normal positions. The portion 85 of the HOLD push button 17 also contains an dependent portion 180 at the end thereof that extends into an opening 179 in the side member 42.

Also located in the left portion of the rectangular housing 41 is a cam block (FIG. 3a) 101 including a plurality of cams 106, 104, 105 and 102 which are operatively associated with the various portions of the slide tray and slide positioning mechanism which includes the shutter and slide clamp control mechanism of this invention which is operatively associated with cam 102. The cam block 101 is rotatably mounted on a shaft 103 which extends through the rectangular housing 41 and is driven by a wrap spring clutch (FIG. 3c) 107 which in turn is driven through worm gearing 108 which is coupled to and driven by the motor 76 by any suitable means (not completely shown), such as a belt 109 and pulley 110 assembly.

When actuated by closing the clutch 107, rotation of the cam block 101 through 360° constitutes one complete cycle of operation of the slide tray and slide positioning mechanism. During a cycle of operation, an image bearing slide within the projector gate 62, if any, is returned to the slide tray 12, the slide tray 12 indexed and the next image bearing slide lowered into the projector gate 62 for projection on the screen 13. In the event that the next position of the slide tray 12 does not contain a slide, the shutter 73 will block the optical path 68 of the projector (FIG. 4a) to prevent illumination of the screen 13.

Figure 4A:
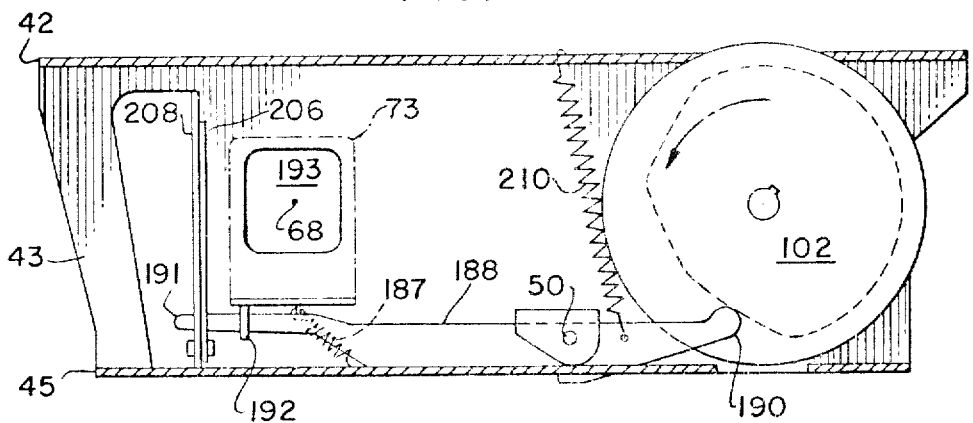
FIG. 4a illustrates part of the shutter and slide clamp control mechanism of this invention.
Figure 4B:
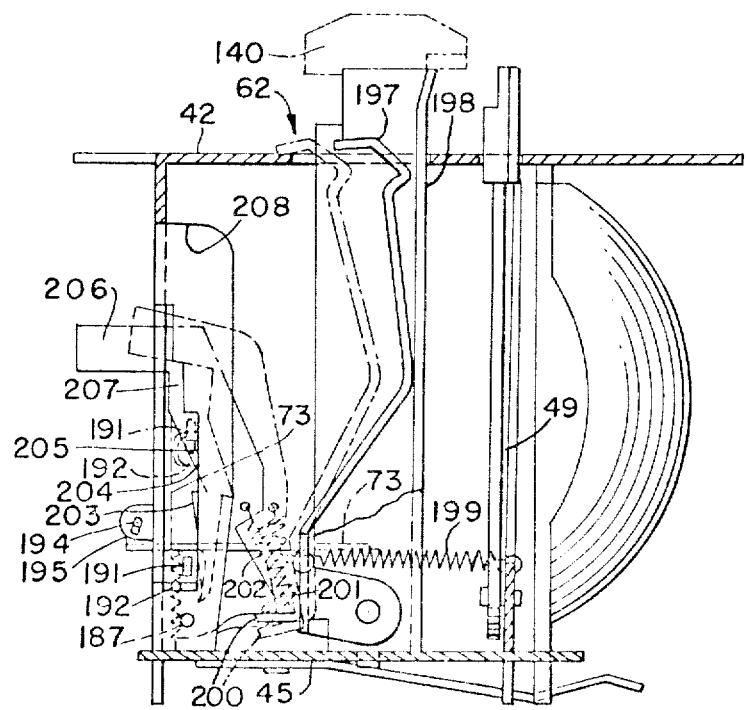
FIG. 4b illustrates another part of the shutter and slide clamp control mechanism of this invention.

FIGS. 3a, 3b and 3c taken together with FIGS. 4a and 4b constitute a clear and complete illustration of the construction and operative features of this invention.

The shutter and slide clamp portion of the slide tray and slide positioning mechanism, which constitutes the subject matter of this invention, is best shown by FIGS. 4a, 4b, 3a, 3b and 3c. A shutter cam follower includes an elongated element 188 rotatably mounted, intermediate the ends thereof, on the shaft 50 that extends through the rectangular housing 41. One end 190 of the shutter cam follower 188 is urged, in a counter-clockwise direction, into engagement with the camming surface 189 of the shutter cam 102 by a spring 210 coupled between the cam follower 188 and the side member 42 of the rectangular housing 41. The other end 191 of the cam follower 188 extends into an opening 207 (FIG. 4b) formed by a member 208 laterally extending from the side member 43 and into the rectangular housing 41. One side 205 of the member 208 defining the opening 207 is in contact with the end 191 of the cam follower 188 and functions as a guiding surface therefor. The end 191 of the cam follower 188 also includes a shutter camming surface 192 that is in contact with the shutter 73. As shown by FIG. 4a, the shutter cam follower 188 in its initial at rest position is located beneath the optical path 68 of the projector which passes through an opening 193 in the side member 43. Tabs 196 and 195 extending from the side member 43 and out from the housing 41 have a shaft 194 extending therethrough (FIGS. 3b and 3c) around which the shutter 73 is rotatably mounted. A spring 187 (FIG. 4a) extending between the shutter 73 and the side member 43 urges the shutter 73 in a clockwise direction (FIG. 4b) against the camming surface 192 on the shutter cam follower 188. As shown, the shutter 73 rotates around an axis that is located below and which is substantially transverse to the optical path 68 of the projector.

The projector gate 62 includes a slide guide member 198 (FIGS. 3a and 4b) extending substantially vertically within the projector gate and which provides guiding surfaces for the image slides on each side of the projector optical path 68. Rotatably mounted at the bottom of the guide slide member 198, along an axis located below the optical path 68 of the projector and substantially parallel to the rotational axis of the shutter 73, is a slide clamp 197 which is urged in a clockwise direction (FIG. 4a) against the slide guiding member 198 by a spring 199 connected between the slide clamp 197 and the side 49 of the housing 41. The slide clamp 197 contains a protruding tab 200 at one side thereof which contacts an extension 201 of an actuator clamp 206 which is rotatably mounted to the member 208 near the bottom thereof by any number of well known means (not shown) along an axis below the optical path 68 of the projector and substantially parallel to the rotational axis of the shutter 73. As mounted, the clamp actuator 206 extends in a vertical direction within the projector gate along one side of the optical path 68 of the projector. A spring 202 connected between the clamp actuator 206 and the slide clamp 197 urges the clamp actuator 206 in a clockwise direction (FIG. 4b). The extension 201 of the clamp actuator 206 engaging the tab 200 protruding from the slide clamp 197 limits clockwise rotation of the clamp actuator 206. The clamp actuator 206 includes a camming surface 204 and a latching member 203. The presence of a slide between the slide guide 198 and the slide clamp 197 prevents clockwise rotation of the slide clamp 197 (FIG. 4b) around its rotational axis against the slide guide 198. This positions the tab 200 projecting from the slide clamp 197 at a location that enables clockwise rotation of the clamp actuator 206, under urging of the spring 202 such that the latching member 203 does not extend into the opening 207 formed by the member 208. The absence of a slide between the slide clamp 197 and the slide guide 198 enables further clockwise rotation of the slide clamp 197 with a resulting reduction in the extent of clockwise rotation of the clamp actuator 206 around its rotational axis which causes the latching portion 203 of the clamp actuator 206 to extend into the opening 207.

Operation of the shutter 73 and slide clamp 197 portion of the slide tray and slide positioning mechanism is such that shortly after the initiation of a projector cycle, the shutter cam 192 causes counter-clockwise rotation (FIG. 4b) of the shutter 73 around its rotational axis to block the optical path 68 of the projector. The end 191 of the cam follower 188 moves in a direction transverse to and across the optical path 68 of the projector. The end 191 of the cam follower 188 being located near the axis of rotation of the shutter 73 results in counter-clockwise rotation of the shutter (FIG. 4b) under urging of the shutter camming surface 192 to a position in which the shutter 73 will block the opening 193 in the side member 43, thereby completely blocking the optical path 68 of the projector, for a relatively small upward movement of the end 191 of the shutter cam follower 188. Subsequent engagement of the end 191 of the cam shutter follower 188 with the camming surface 204 of the clamp actuator 206 causes clockwise rotation of the clamp actuator 206 which results in counter-clockwise rotation of the slide clamp 197 (FIG. 4b). Accordingly, when the shutter camming surface 192 has reached the end of its upward motion, the shutter 73 has been closed and the slide clamp 197 is opened to permit entry of a new image bearing slide into the projector gate 62. The end 191 of the shutter cam follower 188 will remain at the end of its upward motion for a time due to a constant radius portion on the camming surface 189 of the shutter cam 102. After a new slide, if any, has been lowered into the projector gate 62, the camming surface 189 of the shutter cam 102 is such that counter-clockwise rotation of the shutter cam follower 188 around its rotational axis (FIG. 4a) is achieved under urging of the spring 210. However, if a slide is absent in the slide position newly indexed to, the latching member 203 of the clamp actuator 206 will extend into the opening 207, as discussed hereinabove. For this condition, the latching member 203 of the clamp actuator 206 will prevent further downward movement of the end 191 of the shutter cam follower 188. This results in the shutter camming surface 192 retaining the shutter 73 in a position which blocks the optical path 68 of the projector thereby preventing projection of any light on the viewing screen 13. In the event a new slide is entered into the projector gate, the slide clamp 197 cannot rotate against the slide guide 198, as discussed hereinabove, which results in a latching member 203 not appearing in the opening 207 which further results in the end 191 of the cam follower being returned to its initial position under urging of the spring 210. This results in clockwise rotation of the shutter 73 (FIG. 4b) under urging of the shutter spring 187 to its initial position where the shutter does not block the optical path 68 of the projector thereby enabling the image on the slide just entered into the projector gate 62 to appear on the screen 13.

As will be apparent from the above description, the shutter and slide clamp control mechanism goes through a complete cycle once for each projector cycle. The operation of the entire slide tray and slide positioning mechanism shown n FIGS. 3a, 3b and 3c, of which the present invention is a part, is described in detail in co-pending patent application having Ser. No. 364,471 filed May 29, 1973 and entitled SLIDE TRAY AND SLIDE POSITIONING MECHANISM, the disclosure of which is incorporated herein by reference.

Other embodiments and modifications of this invention as described will be apparent to those skilled in the art without departing from the spirit and scope of this invention as defined by the following claims.

What is claimed is:
1. Apparatus for projecting slides comprising:
a slide projector including a gate; said gate including a flat shutter member mounted near one end thereof about an axis in a plane substantially normal to the optical path of said projector;
said shutter member having a first position blocking the optical path of said projector and a second position for which the optical path of said projector is not blocked; and
shutter control means for causing said shutter to be in its first position in response to the absence of a slide in said gate and for causing said shutter to be in its second position in response to the presence of a slide in said gate to enable projection of the image of said slide;
said shutter control means including:
means biasing said shutter in said second position;
means for rotating said shutter around said rotational axis to said first position in opposition to said biasing means and for enabling counter-rotation of said shutter around said rotational axis to said second position under the urging of said biasing means;
said means for rotating said shutter including an elongated member having a camming surface thereon in contact with the flat surface of said shutter member; and
said elongated member adapted to be reciprocated in a direction transverse to the optical axis of said projector and in a plane substantially parallel to the rotational axis of said shutter with said camming surface in contact with the flat surface of said shutter to rotate said shutter to said first position;
means for sensing the absence of a slide in said gate for latching said elongated member in a position wherein said shutter is at said first position and for sensing the presence of a slide in said gate for enabling the return of said shutter to said second position a stationary slide guide;
a slide clamp rotatably mounted on an axis in a plane substantially normal to the axis of said optical path; and
means biasing said slide clamp toward said slide guide.

2. The apparatus according to claim 1 further including:
a housing;
said projector located within said housing;
a slide tray located on the exterior of said housing and adapted to contain a plurality of slides for projection by said projector;
said housing including a display surface for viewing the projected image of said slides; and
means contained within said housing for folding the optical path of said projector at least once.

3. The apparatus according to claim 2 further including:
manually actuated means mounted on said housing for selectively actuating said projector.

4. The apparatus according to claim 1 further including:
a housing;
said projector located within said housing;
a slide tray located on said housing; and
said housing including a display surface for viewing the projected image of said slides.

5. The apparatus according to claim 4 further including:
manually actuated switches mounted on said housing for selectively actuating said projector.

6. The apparatus according to claim 1 further including:
actuator means rotatably mounted on an axis in a plane substantially normal to said optical axis and coupled to said slide clamp to be rotated to a first position when there is a slide positioned between said slide guide and said slide clamp and to be rotated to a second position in the absence of a slide between said slide guide and said guide clamp.

7. The apparatus according to claim 6 wherein:
said actuator presents a latching surface to said elongated member to prevent counter-rotation of said shutter to its second position whenever said actuator is at its said second position.

8. The apparatus according to claim 7 further including:

means biasing said actuator means to its said second position thereby preventing said latching surface from inhibiting counter-rotation of said shutter whenever a slide is present between said slide guide and said slide clamp.

9. The apparatus according to claim 6 wherein:
the axis of rotation of said actuator means is substantially parallel to the axis of rotation of said slide clamp.

10. The apparatus according to claim 6 wherein:
the axis of rotation of said slide clamp and said actuator means are substantially parallel to the axis of rotation of said shutter.

11. The apparatus according to claim 6 wherein:
said slide clamp is situated between slide guide and said shutter.

12. The apparatus according to claim 11 wherein:
said actuator means is situated along side of said shutter.

13. The apparatus according to claim 12 wherein:
said means for rotating said shutter has a path of movement between said shutter and said actuator means.

14. The apparatus according to claim 13 wherein:
said projector gate includes a surface along the direction of movement of said means for rotating said shutter for guiding said means for rotating said shutter.

15. The apparatus according to claim 1 wherein:
said axis of rotation of said slide clamp is substantially parallel to the axis of rotation of said shutter.

* * * * *